(12) United States Patent
Jung

(10) Patent No.: US 10,766,447 B2
(45) Date of Patent: Sep. 8, 2020

(54) AIRBAG FOR TABLE OF VEHICLES

(71) Applicants: Hyundai Motor Company, Seoul (KR); Kia Motors Corporation, Seoul (KR)

(72) Inventor: Yu Mi Jung, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 52 days.

(21) Appl. No.: 16/195,255

(22) Filed: Nov. 19, 2018

(65) Prior Publication Data

US 2020/0122670 A1    Apr. 23, 2020

(30) Foreign Application Priority Data

Oct. 17, 2018 (KR) .................... 10-2018-0123821

(51) Int. Cl.
*B60R 21/207* (2006.01)
*B60R 21/205* (2011.01)
(Continued)

(52) U.S. Cl.
CPC .......... *B60R 21/207* (2013.01); *B60R 21/205* (2013.01); *B60R 21/2334* (2013.01);
(Continued)

(58) Field of Classification Search
CPC . B60R 1/205; B60R 21/207; B60R 2021/022; B60R 21/2072; B60R 21/2334;
(Continued)

(56) References Cited

U.S. PATENT DOCUMENTS 3,985,374 A    10/1976   Powaska
5,645,319 A *  7/1997   Parks, Jr. ............... A47C 16/00
                                                          297/391
(Continued)

FOREIGN PATENT DOCUMENTS

DE    69604646 T2    6/2000
DE    10361227 A1    7/2005
(Continued)

OTHER PUBLICATIONS

Translation of DE 10361227 A1 accessed at espacenet.com on Mar. 5, 2020. (Year: 2005).*

(Continued)

*Primary Examiner* — Paul N Dickson
*Assistant Examiner* — Hilary L Johns
(74) *Attorney, Agent, or Firm* — Mintz Levin Cohn Ferris Glovsky and Popeo, P.C.

(57) ABSTRACT

An airbag system for a vehicle table is provided. The system includes a table disposed in front of a passenger and an airbag cushion that is provided inside the table. The airbag cushion expands while being deployed in a state in which a first end portion of the airbag cushion is fixed to an internal portion of an edge of the table to allow a second end portion to protrude above the table and to cover an upper surface of the table. The airbag cushion also includes a bottom surface portion that faces the table, which is positioned at an interval from the upper surface of the table while the airbag cushion is deployed. An inflator supplies gas to the airbag cushion to deploy the airbag cushion.

16 Claims, 13 Drawing Sheets

(51) Int. Cl.
*B60R 21/2334* (2011.01)
*B64D 11/06* (2006.01)
*B60R 21/2338* (2011.01)
*B63B 17/00* (2006.01)

(52) U.S. Cl.
CPC ..... *B60R 2021/23386* (2013.01); *B63B 17/00* (2013.01); *B64D 11/06205* (2014.12)

(58) Field of Classification Search
CPC .... B60R 2021/23386; B64D 11/06205; B64D 11/0638
USPC ..................................................... 280/730.1
See application file for complete search history.

(56) References Cited

U.S. PATENT DOCUMENTS

| 5,655,817 | A  | * | 8/1997 | Nienow | ............... | B60N 2/2839 |
| | | | | | | 297/216.11 |
| 10,232,815 | B1 | * | 3/2019 | Dry | ....................... | B60R 21/207 |
| 10,569,732 | B2 | * | 2/2020 | Nagasawa | ................ | B60N 2/79 |
| 2015/0042078 | A1 | * | 2/2015 | Gehret | ................ | B64D 11/062 |
| | | | | | | 280/728.2 |
| 2016/0001735 | A1 | * | 1/2016 | Quatanens | ............ | B60R 21/233 |
| | | | | | | 244/121 |
| 2016/0107598 | A1 | * | 4/2016 | Fischer | ................. | B60R 21/231 |
| | | | | | | 280/729 |
| 2017/0008632 | A1 | * | 1/2017 | Eberle | ................ | B64D 11/0619 |
| 2017/0240285 | A1 | * | 8/2017 | Strobl | .............. | B64D 11/06205 |
| 2017/0259772 | A1 | * | 9/2017 | Farooq | ................... | B60N 3/001 |
| 2019/0144121 | A1 | * | 5/2019 | Young | .................... | B60N 3/004 |
| 2019/0303729 | A1 | * | 10/2019 | Gramenos | ............ | G06K 9/6288 |
| 2020/0037757 | A1 | * | 2/2020 | Onoyama | .............. | B60N 2/005 |

FOREIGN PATENT DOCUMENTS

| KR | 10-0412839 B1 | 12/2003 | |
| WO | 2017214519 A1 | 12/2017 | |
| WO | WO-2018167899 A1 * | 9/2018 | ............... B60N 3/00 |

OTHER PUBLICATIONS

Extended European Search Report for European Patent Application No. 18207704, dated Feb. 11, 2019, 8 pages.

* cited by examiner

AIRBAG FOR TABLE OF VEHICLES

CROSS REFERENCE TO RELATED APPLICATION

The present application claims priority to Korean Patent Application No. 10-2018-0123821, filed on Oct. 17, 2018, the entire contents of which is incorporated herein for all purposes by this reference.

BACKGROUND

1. Technical Field

The present disclosure relates to an airbag for a table of a vehicle, and more particularly, to a vehicle airbag that covers an upper surface of a table and confines an object positioned on the upper surface of the table when a vehicle collision occurs, thereby protecting a passenger from injury due to the object and impact injury.

2. Description of the Related Art

In general, an airbag is designed to be deployed toward a passenger to minimize injury of the passenger when a collision occurs. In general, a driver seat airbag is installed inside a steering wheel and a passenger seat airbag is installed inside a dashboard. However, since a conventional airbag is installed only at a front seat for a driver or a passenger at a front passenger seat, the body part of a passenger at a rear passenger seat is pushed against a seatback of a front seat when a vehicle collision occurs which increases injury of the passenger at the rear passenger seat. An alternative thereof proposes an airbag for a rear seat of a vehicle designed to protect a passenger at a rear seat by installing an airbag at a rear surface of a seatback of a front seat to deploy the airbag toward the passenger at the rear set when a collision occurs.

Recently, technologies for providing a table fixed to a rear surface of a seatback of a front seat or an arm rest of a rear seat to provide convenience to a passenger at the rear seat have been applied to vehicles. However, when a vehicle collision occurs and a table is deployed in a use state and an object such as a cup or a notebook personal computer (PC) is disposed on an upper surface of the table, the passenger at the rear seat is pushed against the table or the object disposed on the upper surface of the table is blown away toward the passenger to injury the passenger even when the rear seat airbag for a vehicle is deployed as described above.

SUMMARY

An object of the present disclosure is to provide an airbag for a table of a vehicle, which is deployed to cover an upper surface of the table and to confine an object positioned on the upper surface of the table, thereby protecting passengers from impact injury.

According to an exemplary embodiment of the present disclosure, an airbag for a table of a vehicle may include a table disposed in front of a passenger, an airbag cushion that is provided inside the table, expands while being deployed in a state in which a first end portion of the airbag cushion is fixed to an internal portion of an edge of the table to allow a second end portion to protrude above the table and to cover an upper surface of the table, and may include a bottom surface portion facing the table, which is positioned at an interval from the upper surface of the table while the airbag cushion is deployed, and an inflator configured to supply gas to the airbag cushion.

In the airbag cushion, a first end portion may be fixed to one edge of the table and a second end portion may expand up to a space between the table and the passenger beyond the other edge of the table while the airbag cushion is deployed. In particular, the table may include a first edge at a passenger side, a second edge at an opposite side to the first edge, and a pair of opposite edges for connecting the first edge and the second edge to each other and the airbag cushion may be fixed into the second edge and the opposite edges of the table.

A tear line for connecting the second edge and the opposite edges to each other may be formed on the table and a second end portion of the airbag cushion may protrude above the table as the tear line is torn while the airbag cushion is deployed. The table may include a first edge at a passenger side, a second edge at an opposite side to the first edge, and a pair of opposite edges for connecting the first edge and the second edge to each other and the airbag cushion may be fixed into the second edge of the table.

The airbag for a table of a vehicle may further include a limiting tether having a first end fixed to a side of the first end portion of the airbag cushion fixed into the second edge of the table and a second end connected to a side of the second end portion of the airbag cushion to limit a deployment distance of the second end portion of the airbag cushion. The limiting tether may be configured in pair of limiting tethers provided at the opposite edges of the table, respectively, and each limiting tether may connect the first and second end portions of the airbag cushion to each other at opposite side portions of the airbag cushion.

The table may include a first edge at a passenger side, a second edge at an opposite side to the first edge, and a pair of opposite edges for connecting the first edge and the second edge to each other and the airbag cushion may be configured in one pair of airbag cushions that are fixed into the opposite edges of the table. The pair of airbags may be deployed in a direction to face each other toward the center of the table while being deployed.

The airbag for a table of a vehicle may further include pulling tethers configured in one pair of tethers having a first end fixed to the second edge of the table and a second end connected to a lateral surface of a front seat of each of the airbag cushions and configured to deploy the second end portion of each of the airbag cushions toward the center of the table. The pulling tethers may have a first end fixed to a central portion of the second edge of the table and a second end connected to the second end portion of the lateral surface of the front seat of each of the airbag cushions. Additionally, the pulling tethers may have a first end fixed to an edge at the first end portion of each of the airbag cushions and a second end connected to the lateral surface of the front seat of each of the airbag cushions.

The airbag cushions may include concave portions formed on one surface at a passenger, for loading the passenger. The table may be installed in a rear surface of a front seatback, an arm rest, or a dashboard through a mounting portion. The inflator may be installed in a front seatback, an arm rest, a table, a dashboard, or a mounting portion and may be connected to the airbag cushion to provide expansive force to the airbag cushion. The airbag cushion may be deployed when the table is deployed in a use state when a vehicle collision occurs.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
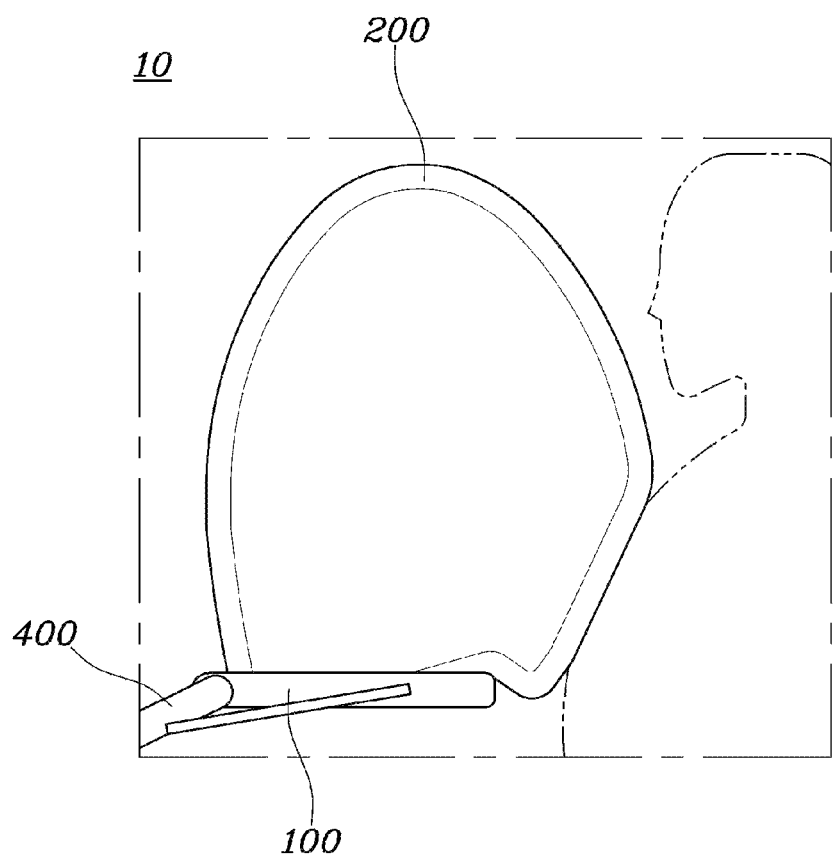
FIGS. 1, 4, 5, 7, 8, and 11 are side views of an airbag for a table of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the embodiments, examples of which are illustrated in the accompanying drawings. However, the exemplary embodiments should not be construed as limited to the exemplary embodiments set forth herein. For reference, like reference numerals in the drawings denote like elements and, under the rule, detailed descriptions that are obvious to ordinary skill in the art or repeated are omitted.

Figure 9:
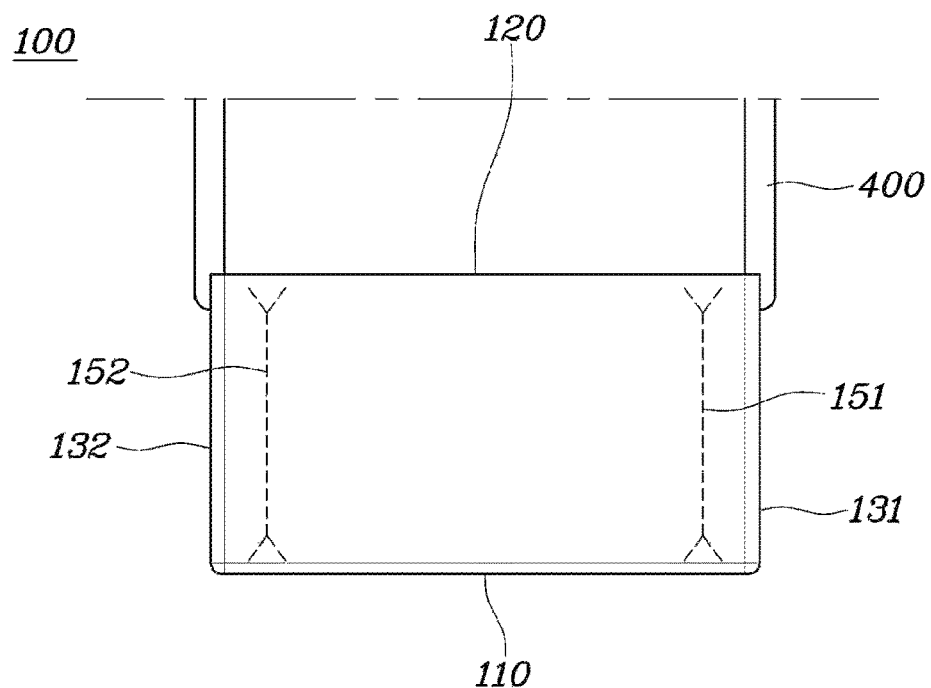
Figure 10:
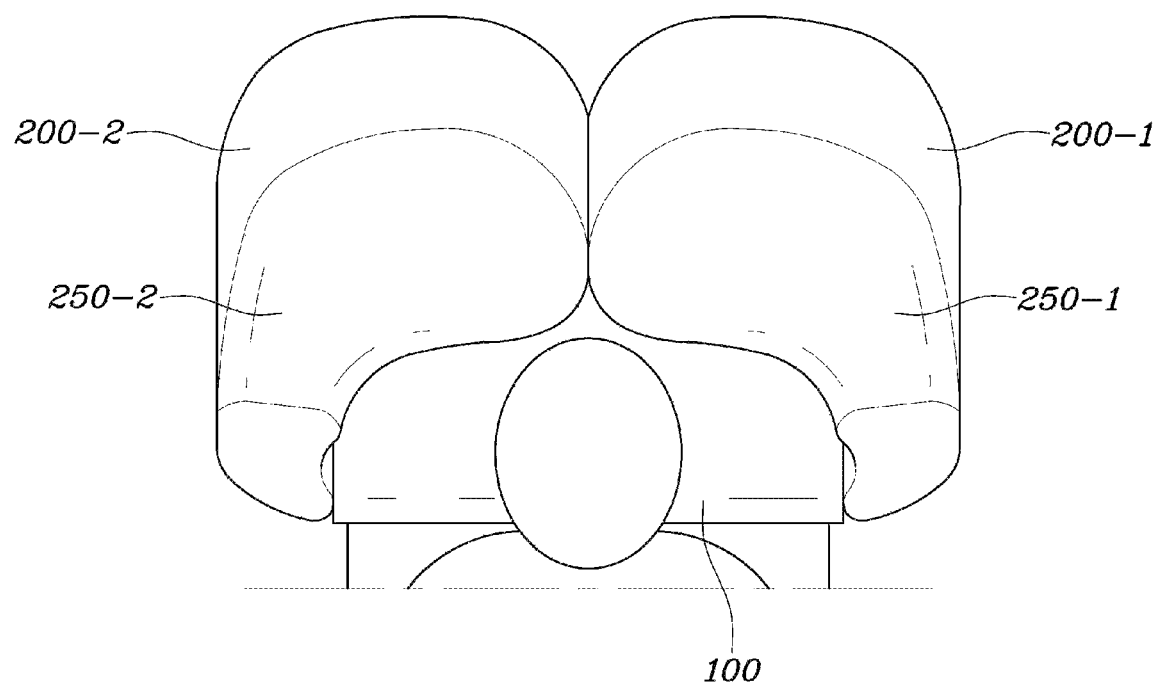
FIG. 10 is a front view of an airbag for a table of a vehicle according to an exemplary embodiment of the present disclosure.
Figure 12:
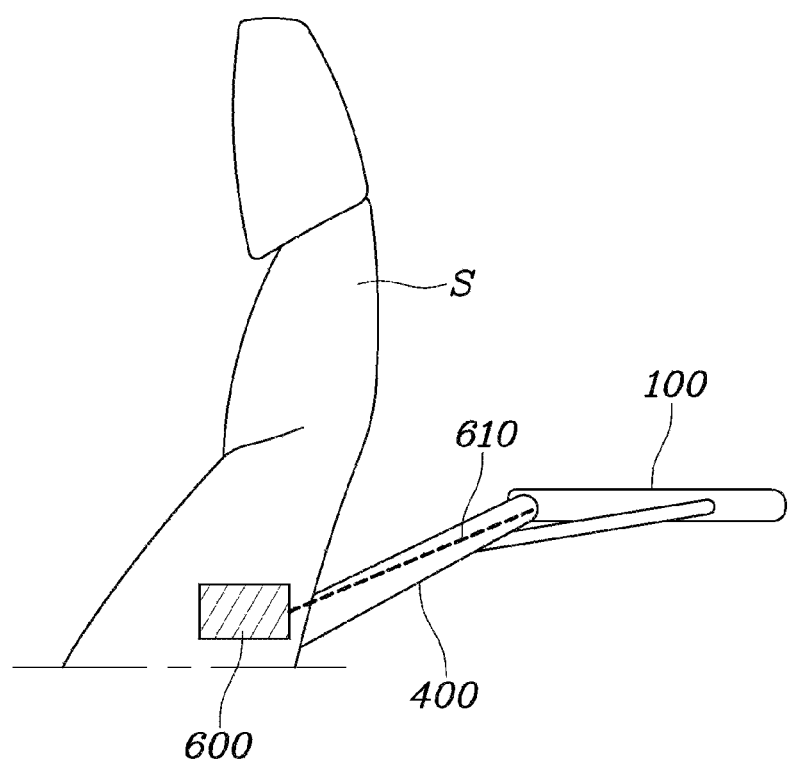
FIGS. 12 and 13 are diagrams showing a position for installing an inflator of an airbag for a table of a vehicle according to an exemplary embodiment of the present disclosure.
Figure 13:
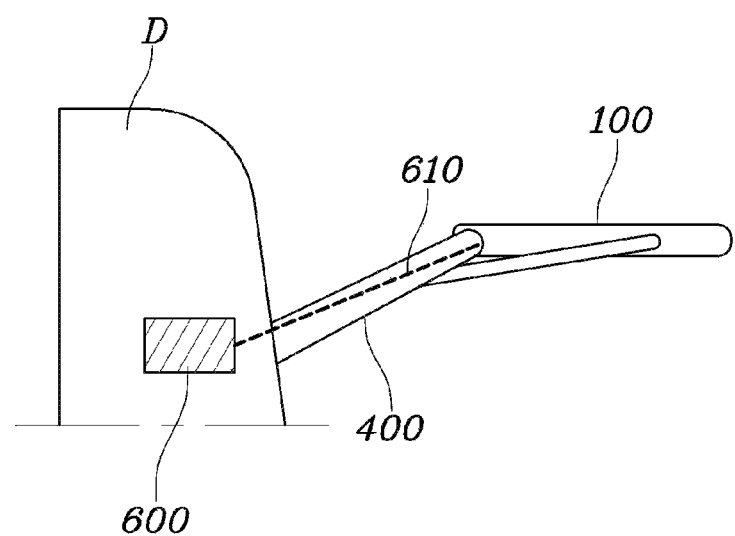

FIGS. 1, 4, 5, 7, 8, and 11 are side views of an airbag for a table of a vehicle according to an exemplary embodiment of the present disclosure. FIG. 2 is a front view of an airbag cushion of an airbag for a table of a vehicle according to an exemplary embodiment of the present disclosure. FIGS. 3, 6, and 9 are front views of a table according to an exemplary embodiment of the present disclosure. FIG. 10 is a front view of an airbag for a table of a vehicle according to an exemplary embodiment of the present disclosure. FIGS. 12 and 13 are diagrams showing a position for installing an inflator of an airbag for a table of a vehicle according to an exemplary embodiment of the present disclosure.

Referring to FIGS. 1, 2, 4, and 5, according to the present disclosure an airbag 10 for a table of a vehicle may include a table 100 disposed in front of a passenger, an airbag cushion 200 that is provided inside the table 100, expands while being deployed in a state in which a first end portion 210 of the airbag cushion 200 is fixed to an internal portion of an edge of the table 100 to allow a second end portion 220 of the airbag cushion 200 to protrude above the table 100 and to cover an upper surface of the table 100, and may include a bottom surface portion 230 facing the table 100, which is positioned at an interval from the upper surface of the table 100 while the airbag cushion 200 is deployed, and an inflator 600 configured to supply gas to the airbag cushion 200.

Referring to FIGS. 3, 6, and 9, the table 100 may include a first edge 110 at a passenger side, a second edge 120 at an opposite side to the first edge 110, and a pair of opposite edges 131 and 132 for connecting the first edge 110 and the second edge 120 to each other. In particular, a tear line 150 for connecting the second edge 120 and the opposite edges 131 and 132 to each other may be formed on the table 100. The tear line 150 may be formed on the second edge 120 of the table 100. In addition, tear lines 151 and 152 may be formed on the opposite edges 131 and 132 of the table 100.

Figure 4:
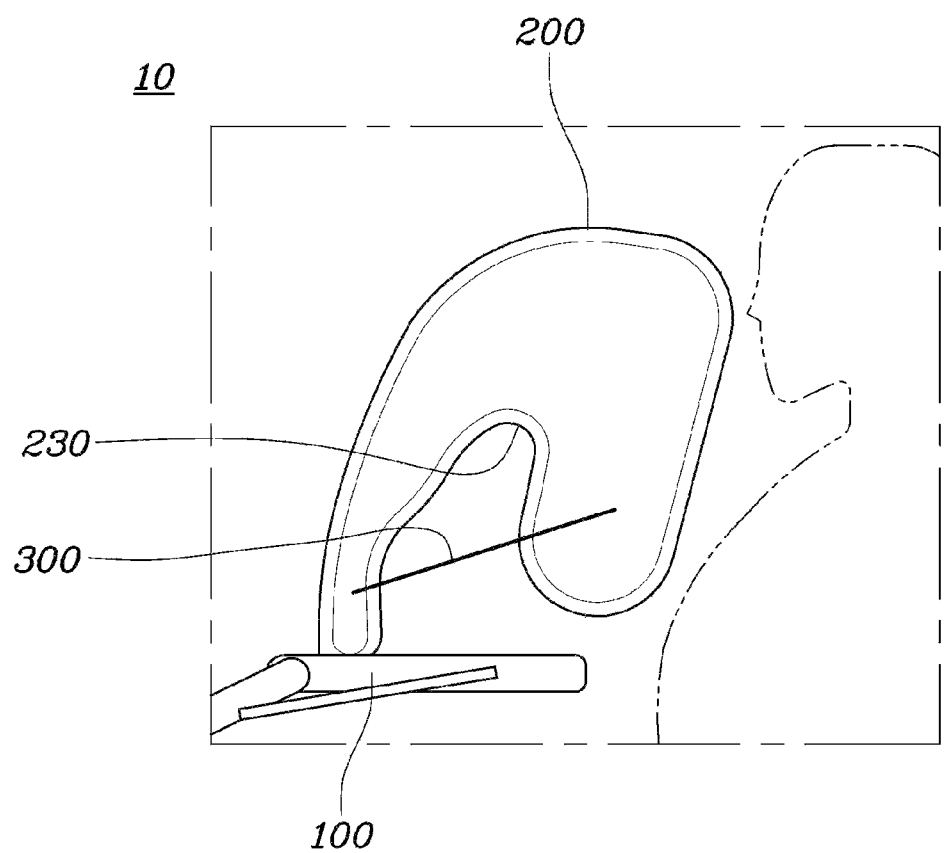
Figure 5:
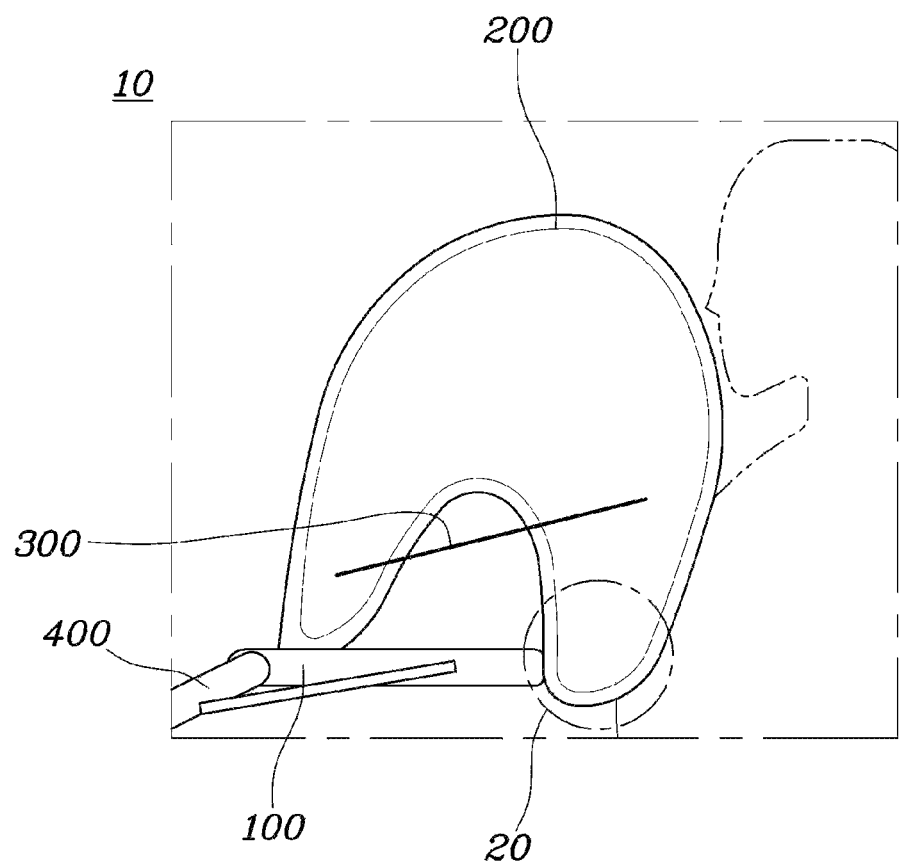
Figure 6:
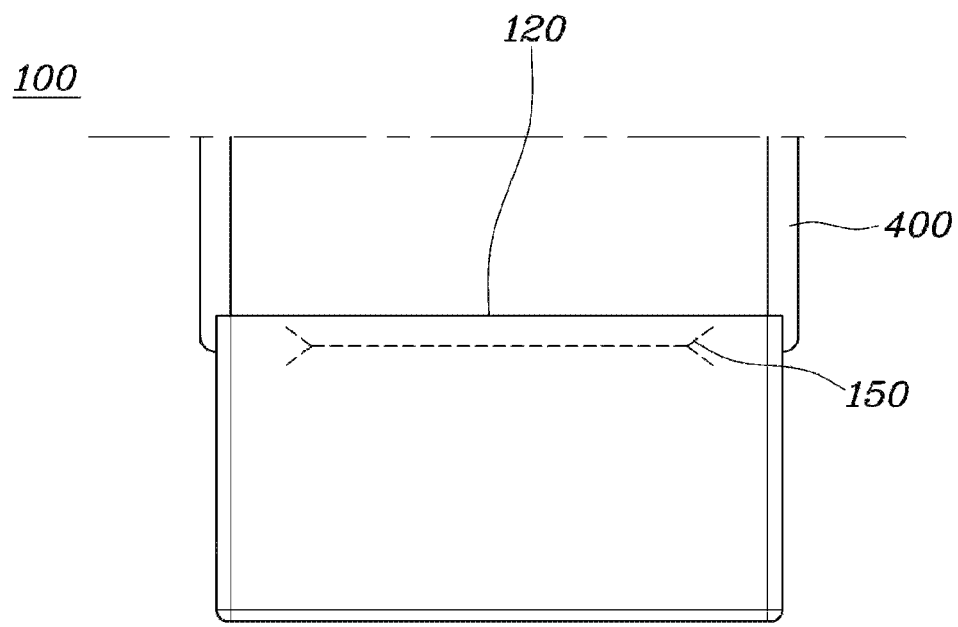

Referring to FIGS. 2, 4, and 5, the airbag cushion 200 may expand while being deployed in a state in which the first end portion 210 of the airbag cushion 200 is fixed to an internal portion of an edge of the table 100 to allow the second end portion 220 to protrude above the table 100 and to cover an upper surface of the table 100. In particular, the second end portion of the airbag cushion 200 may protrude upward and, then, may be deployed forward or backward. In other words, when the first end portion of the airbag cushion 200 is fixed to a passenger side of the table 100, the second end portion of the airbag cushion 200 may be deployed upward and forward and, when the first end portion of the airbag cushion 200 is fixed to an opposite side of the table to the passenger, the second end portion may be deployed upward and backward and, thus, the airbag cushion 200 may cover the table to safely protect the passenger.

When the airbag cushion 200 is deployed, the bottom surface portion 230 of the airbag cushion 200, which faces the table 100, may be positioned with an interval from the upper surface of the table 100. Accordingly, when the table 100 is deployed in a use state and an object is positioned on the upper surface of the table 100, when the airbag cushion 200 is deployed, the object may be confined between the upper surface of the table 100 and the bottom surface portion 230 of the airbag cushion 200, thereby preventing accidents caused when the object positioned on the upper surface of the table 100 or the table 100 is dashed, pushed, or otherwise moved against or towards the passenger.

As the bottom surface portion 230 of the deployed airbag cushion 200 is positioned at an interval from the upper surface of the table 100, a volume of the airbag cushion 200 may be reduced and, as the volume of the airbag cushion 200 is reduced, an amount of gas supplied to the airbag cushion 200 may be reduced. The tear line 150 formed on the table 100 may be torn and the second end portion 220 may protrude above the table 100 while the airbag cushion 200 is deployed.

Figure 2:
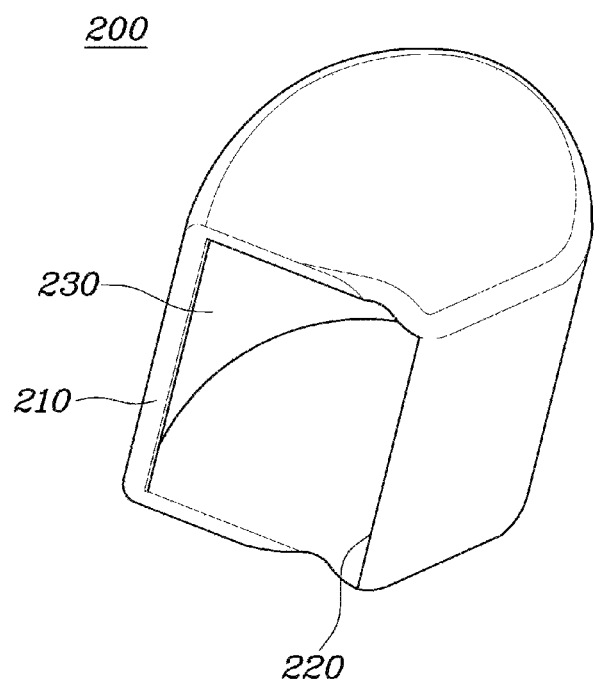
FIG. 2 is a front view of an airbag cushion of an airbag for a table of a vehicle according to an exemplary embodiment of the present disclosure.
Figure 3:
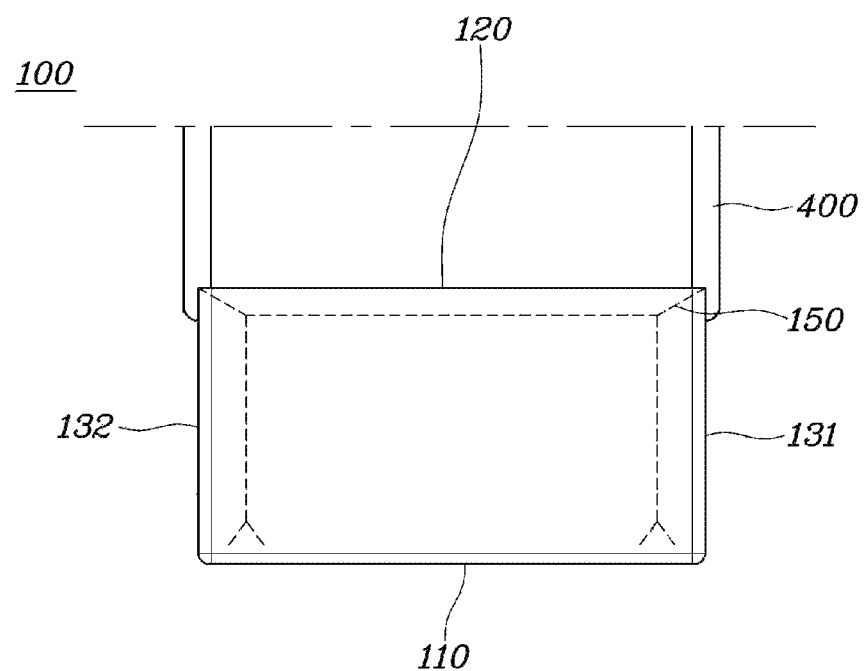
FIGS. 3, 6, and 9 are front views of a table according to an exemplary embodiment of the present disclosure.

Referring to FIGS. 1, 2, and 5, the first end portion 210 may be fixed to one edge 120 (e.g., a second edge) of the table 100 and the second end portion 220 may expand up to a space 20 between the table 100 and the passenger beyond the other edge 110 (e.g., a first edge) of the table 100 while the airbag cushion 200 is deployed. Accordingly, the airbag cushion 200 may expand up to the space 20 between the table 100 and the passenger, thereby preventing the passenger from being injury when the passenger is dashed against an edge of the table 100 when a collision occurs.

Particularly, the airbag cushion 200 may be fixed into the second edge 120 and the opposite edges 131 and 132 of the table 100. The airbag cushion 200 may be fixed into the second edge 120 of the table 100. In addition, the airbag cushion 200 may further include a limiting tether 300 having a first end fixed to a side of the first end portion 210 of the airbag cushion 200 fixed into the second edge 120 of the table 100 and a second end connected to a side of the second end portion 220 of the airbag cushion 200 to limit a deployment distance of the second end portion of the airbag cushion 200 when the airbag cushion 200 is fixed only into the second edge 120 of the table 100.

The limiting tether 300 may be configured in one pair of limiting tethers provided at the opposite edges 131 and 132 of the table 100, respectively, and each limiting tether 300 may connect the first end portion 210 and the second end portion 220 of the airbag cushion 200 to each other at opposite side portions of the airbag cushion 200. Airbag cushions 200-1 and 200-2 may be configured in one pair of airbag cushions that are fixed into the opposite edges 131 and 132 of the table 100, respectively. In particular, one pair of airbag cushions 200-1 and 200-2 may be deployed in a direction to face each other toward the center of the table 100 while being deployed.

Figure 7:
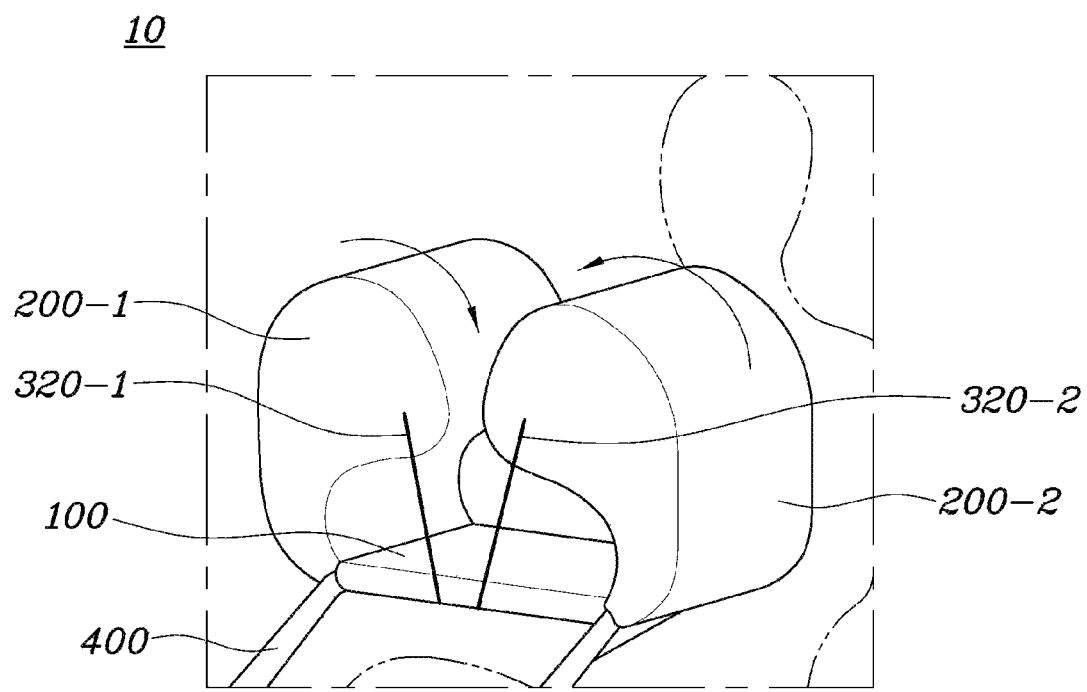
Figure 8:
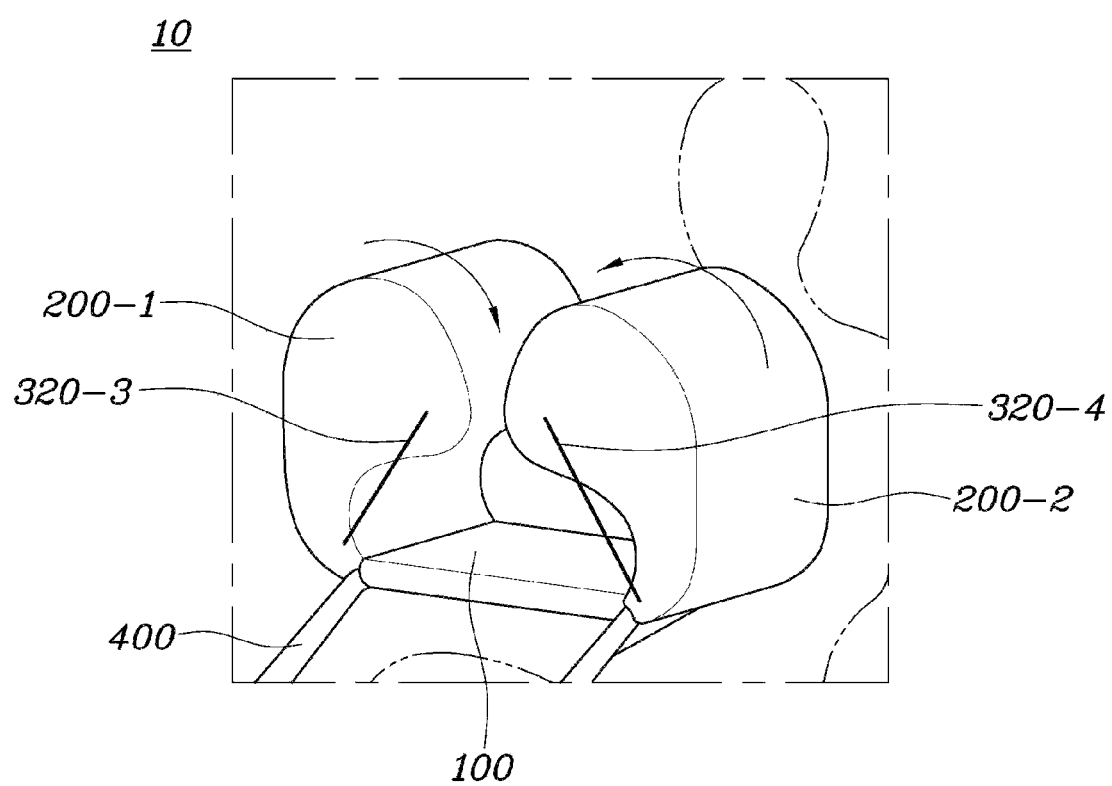

Referring to FIGS. 7 and 8, the airbag 10 for the table of the vehicle may further include pulling tethers 320-1, 320-2, 320-3, and 320-4 configured in one pair of tethers having a first end fixed to the second edge 120 of the table 100 and a second end connected to a lateral surface of a front seat of each of the airbag cushions 200-1 and 200-2 and configured to deploy the second end portion of each of the airbag cushions 200-1 and 200-2 toward the center of the table 100.

In particular, referring to FIG. 7, the pulling tethers 320-1 and 320-2 may have a first end fixed to a central portion of the second edge 120 of the table 100 and a second end connected to the second end portion of the lateral surface of the front seat of each of the airbag cushions 200-1 and 200-2. Referring to FIG. 8, the pulling tethers 320-3 and 320-4 may have a first end fixed to an edge at the first end portion of each of the airbag cushions 200-1 and 200-2 and a second end connected to the second end portion of the lateral surface of the front seat of each of the airbag cushions 200-1 and 200-2.

A position of a tear line formed on the upper surface of the table may be changed based on a connection portion between the pulling tethers 320-1, 320-2, 320-3, and 320-4 and the airbag cushions 200-1 and 200-2. In other words, when a first end of the pulling tethers 320-1, 320-2, 320-3, and 320-4 is fixed to the central portion of the second edge 120 of the table 100 and a second end of the pulling tethers 320-1, 320-2, 320-3, and 320-4 is connected to the second end portion of the lateral surface of the front seat of the airbag cushions 200-1 and 200-2, the tear line 150 for connection between the second edge 120 and the opposite edges 131 and 132 may be formed on the table 100 (refer to FIG. 3). In addition, when a first end of the pulling tethers 320-1, 320-2, 320-3, and 320-4 is fixed to an edge at a first end portion of each of the airbag cushions 200-1 and 200-2 and a second end of the pulling tethers 320-1, 320-2, 320-3, and 320-4 is connected to the second end portion of the lateral surface of the front seat of each of the airbag cushions 200-1 and 200-2, the tear lines 151 and 152 may be formed on the opposite edges 131 and 132 of the table 100 (refer to FIG. 9).

Figure 11:
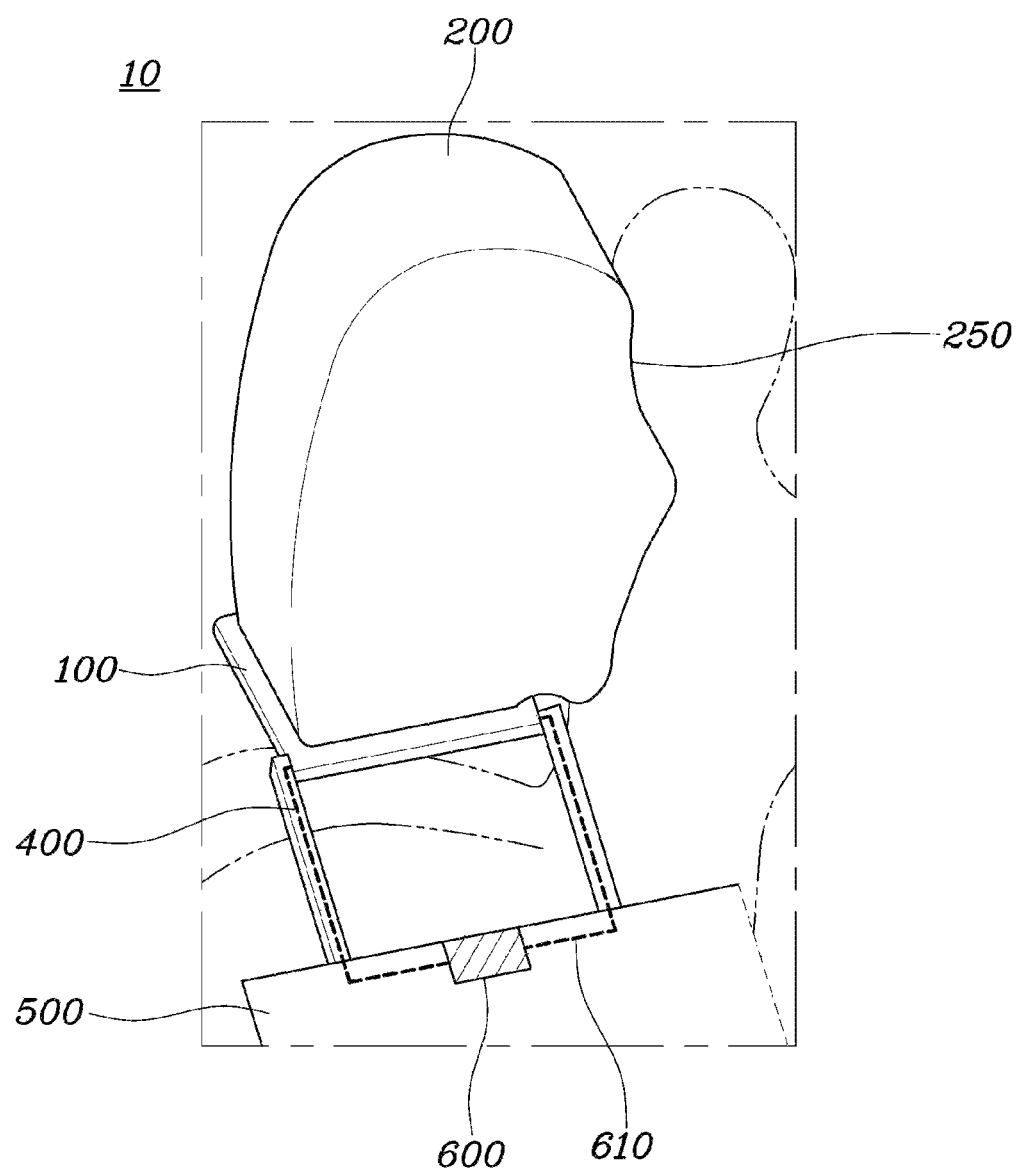

Referring to FIGS. 10 and 11, the airbag cushions 200-1 and 200-2 may include concave portions 250, 250-1, and 250-2 formed on one surface at a passenger side, for loading the passenger. When a vehicle collision occurs, a front surface of a passenger may be loaded in the concave portions 250, 250-1, and 250-2 of the airbag cushions 200-1 and 200-2, thereby reducing shocks applied to the passenger. In other words, the front of a passenger may be positioned into the concave portions of the airbag cushions to reduce shock experienced during a vehicle collision.

As shown in FIGS. 11 to 13, the table 100 may be installed in a rear surface of a front seatback S, an arm rest 500, or a dashboard D through a mounting portion 400. The inflator 600 may be installed in the front seatback S, the arm rest 500, the table 100, the dashboard D, or the mounting portion 400 and may be connected to the airbag cushion 200 to provide expansive force to the airbag cushion 200. Particularly, the arm rest 500 may be a rear seat arm rest and may be an arm rest that corresponds to each seat. The table 100 for enabling the airbag cushion 200 to be deployed may be provided at various positions based on a seat position and a position at which a passenger sits as well as at the dashboard D, the rear surface of the front seatback S, and the arm rest 500.

In other words, as shown in FIG. 11, when the table 100 is installed in the arm rest 500 through the mounting portion 400 and the inflator 600 is installed in the arm rest 500, a path 610 for moving gas therethrough may be formed in the mounting portion 400. Accordingly, gas of the inflator 600 may be provided to the airbag cushion 200 through the path 610 that extends along the mounting portion 400 and, thus, the airbag cushion 200 may expand when the gas is received therein.

As shown in FIG. 12, when the table 100 is installed on the rear surface of the front seatback S through the mounting portion 400 and the inflator 600 is installed in the front seatback S, the path 610 for moving gas therethrough may be formed in the mounting portion 400. Accordingly, gas for expansion of the airbag cushion 200, provided from the inflator 600, may be provided to the airbag cushion 200 through the path 610 that extends along the mounting portion 400, from the inflator 600.

As shown in FIG. 13, when the table 100 is installed on the dashboard D through the mounting portion 400 and the inflator 600 is installed on the dashboard D, the path 610 for moving gas therethrough may be formed in the mounting portion 400. Accordingly, gas for expansion of the airbag cushion 200, provided from the inflator 600, may be provided to the airbag cushion 200 through the path 610 that extends along the mounting portion 400, from the inflator 600 and, thus, the airbag cushion 200 may expand.

In addition, the inflator 600 may be installed in the mounting portion 400 or the table 100. Accordingly, as the inflator 600 is moved along with the table 100 and the mounting portion 400 and the inflator 600 is connected directly to the airbag cushion 200, expansion speed of the airbag cushion 200 may be rapidly ensured. As such, the table 100 may be disposed at various positions based on a seat position and a position at which a passenger sits as well as at the rear surface of the front seatback S, the arm rest 500, and the dashboard D and, thus, the inflator 600 configured to supply gas to the airbag cushion 200 provided on the table 100 may be installed at various positions. Notably, the inflator may be operated by a controller mounted within the vehicle and the controller may be configured to operate the inflator based on detecting a vehicle collision.

Particularly, the airbag cushion 200 may be deployed when the table 100 is deployed in a use state when a vehicle collision occurs. Accordingly, the airbag 10 for the table of the vehicle may further include a sensor unit having a first sensor configured to detect whether the table 100 is deployed and a second sensor configured to detect the vehicle collision, and a controller configured to receive information indicating whether the table is deployed and whether vehicle collision occurs from the sensor unit to operate the inflator 600.

As described above, according to the present invention, an upper surface of a table may be covered by an airbag and an object positioned on the upper surface of the table may be confined in the airbag, thereby protecting a passenger from injury due to the object and impact injury. The airbag for a table of a vehicle according to the present disclosure may cover an upper surface of a table and may confine an object positioned on the upper surface of the table inside the airbag when a vehicle collision occurs, thereby protecting a passenger from injury due to the object and impact injury.

Accordingly, the aforementioned exemplary embodiments are exemplary in all aspects and are understood not to be limited. The scope of the present disclosure is defined by the following claims but not the above description and the meaning and scope of the claims and all modifications or modified forms from equivalents thereof are within the scope of the present disclosure.

What is claimed is:

1. An airbag system for a vehicle table, comprising: a table to be disposed in front of a passenger; an airbag cushion disposed inside the table, expands while being deployed in a state in which a first end portion of the airbag cushion is fixed to an internal portion of an edge of the table to allow a second end portion of the airbag cushion to protrude above the table and to cover an upper surface of the table, and includes a bottom surface portion facing the table, which is positioned at an interval from the upper surface of the table while the airbag cushion is deployed; and an inflator configured to supply gas to the airbag cushion, wherein the first end portion of the airbag cushion is fixed to a second edge of the table and the second end portion of the airbag cushion expands up and over the table and beyond a first edge of the table.

2. The airbag system for a vehicle table of claim 1, wherein the table includes the first edge at a passenger side, the second edge at an opposite side to the first edge, and a pair of opposite edges for connecting the first edge and the second edge to each other and the airbag cushion is fixed into the second edge and the opposite edges of the table.

3. The airbag system for a vehicle table of claim 2, wherein a tear line for connecting the second edge and the opposite edges to each other is formed on the table and the second end portion of the airbag cushion protrudes above the table as the tear line is torn while the airbag cushion is deployed.

4. The airbag system for a vehicle table of claim 1, wherein the table includes the first edge at a passenger side, the second edge at an opposite side to the first edge, and a pair of opposite edges for connecting the first edge and the second edge to each other and the airbag cushion is fixed into the second edge of the table.

5. The airbag system for a vehicle table of claim 4, further comprising:
a limiting tether having a first end fixed to a side of the first end portion of the airbag cushion fixed into the second edge of the table and a second end connected to a side of the second end portion of the airbag cushion to limit a deployment distance of the second end portion of the airbag cushion.

6. The airbag system for a vehicle table of claim 5, wherein a plurality of limiting tethers are provided at the opposite edges of the table, respectively, and each limiting tether connects the first end portion and the second end portion of the airbag cushion to each other at opposite side portions of the airbag cushion.

7. An airbag system for a vehicle table, comprising: a table to be disposed in front of a passenger; an airbag cushion disposed inside the table, expands while being deployed in a state in which a first end portion of the airbag cushion is fixed to an internal portion of an edge of the table to allow a second end portion of the airbag cushion to protrude above the table and to cover an upper surface of the table, and includes a bottom surface portion facing the table, which is positioned at an interval from the upper surface of the table while the airbag cushion is deployed; an inflator configured to supply gas to the airbag cushion; and wherein the table includes a first edge at a passenger side, a second edge at an opposite side to the first edge, and a pair of opposite edges for connecting the first edge and the second edge to each other and the airbag cushion is configured in one pair of airbag cushions that are fixed into the pair of opposite edges of the table.

8. The airbag system for a vehicle table of claim 7, wherein the pair of airbags is deployed in a direction to face each other toward a center of the table while being deployed.

9. The airbag system for a vehicle table of claim 8, further comprising: a pair of pulling tethers having a first end fixed to the second edge of the table and a second end connected to a lateral surface of a front seat of each of the airbag cushions and configured to deploy the second end portion of each of the airbag cushions toward a center of the table.

10. The airbag system for a vehicle table of claim 9, wherein the first end of each one of the respective pulling tethers is fixed to a central portion of the second edge of the table and the second respective end is connected to the second end portion of the lateral surface of the front seat of each of the airbag cushions.

11. The airbag system for a vehicle table of claim 9, wherein the first end of each respective pulling tether is fixed to an edge at the first end portion of each of the airbag cushions and wherein the second end of each respective pulling tether is connected to the lateral surface of the front seat of each of the airbag cushions.

12. The airbag system for a vehicle table of claim 7, wherein the airbag cushions include concave portions formed at a passenger side.

13. The airbag system for a vehicle table of claim 1, wherein the table is installed in a rear surface of a front seatback, an arm rest, or a dashboard through a mounting portion.

14. The airbag system for a vehicle table of claim 13, wherein the inflator is installed in the front seatback, the arm rest, the table, the dashboard, or the mounting portion and is connected to the airbag cushion to provide expansive force to the airbag cushion.

15. The airbag system for a vehicle table of claim 1, wherein the airbag cushion is deployed when the table is deployed in a use state when a vehicle collision occurs.

16. The airbag system for a vehicle table of claim 1, further comprising:
- a sensor unit configured to detect whether the table is deployed and detect a vehicle collision; and
- a controller configured to operate the inflator when the table is detected to be deployed and the vehicle collision is detected.

* * * * *